United States Patent [19]
Satran

[11] Patent Number: 5,156,502
[45] Date of Patent: Oct. 20, 1992

[54] CUTTING INSERT

[75] Inventor: Amir Satran, Kfar Havradim, Israel

[73] Assignee: Iscar Ltd., Tefen, Israel

[21] Appl. No.: 578,070

[22] Filed: Sep. 5, 1990

[30] Foreign Application Priority Data

Sep. 7, 1989 [GB] United Kingdom ............... 8920225

[51] Int. Cl.⁵ .................... B23B 27/04; B23B 27/16
[52] U.S. Cl. ................................. 407/110; 407/113; 407/117
[58] Field of Search ......... 407/107, 109, 110, 113-117

[56] References Cited

U.S. PATENT DOCUMENTS

| | | | |
|---|---|---|---|
| 3,653,107 | 4/1972 | Hertel | 407/113 X |
| 4,118,138 | 10/1978 | Takacs et al. | 407/112 |
| 4,332,513 | 6/1982 | Gowanlock | 407/107 X |
| 4,674,371 | 6/1987 | Smolders | 407/112 X |
| 4,992,007 | 2/1991 | Satran | 407/110 |

FOREIGN PATENT DOCUMENTS

| | | | |
|---|---|---|---|
| 150901 | 8/1985 | European Pat. Off. | 407/113 |
| 114588 | 6/1978 | Japan | 407/113 |

Primary Examiner—Steven C. Bishop
Attorney, Agent, or Firm—Burgess, Ryan & Wayne

[57] ABSTRACT

A cutting insert comprising a central body portion having a longitudinal plane of symmetry, a pair of oppositely directed end portions formed integrally with said body portion and being respectively formed with rake and flank surfaces and with first and second cutting edges of substantially equal width, the flank surfaces of each end portion tapering by amounts and in directions such as to provide clearance between the flank surfaces and the side walls of the groove being cut, a normal to the midpoint of said first cutting edge being inclined, in a first sense, with respect to said plane of symmetry, by an angle α and a normal to the midpoint of said second cutting edge being inclined in a second and opposite sense with respect to said plane of symmetry by an angle α, whereby said edges are inclined with respect to each other by an angle 2α.

2 Claims, 7 Drawing Sheets

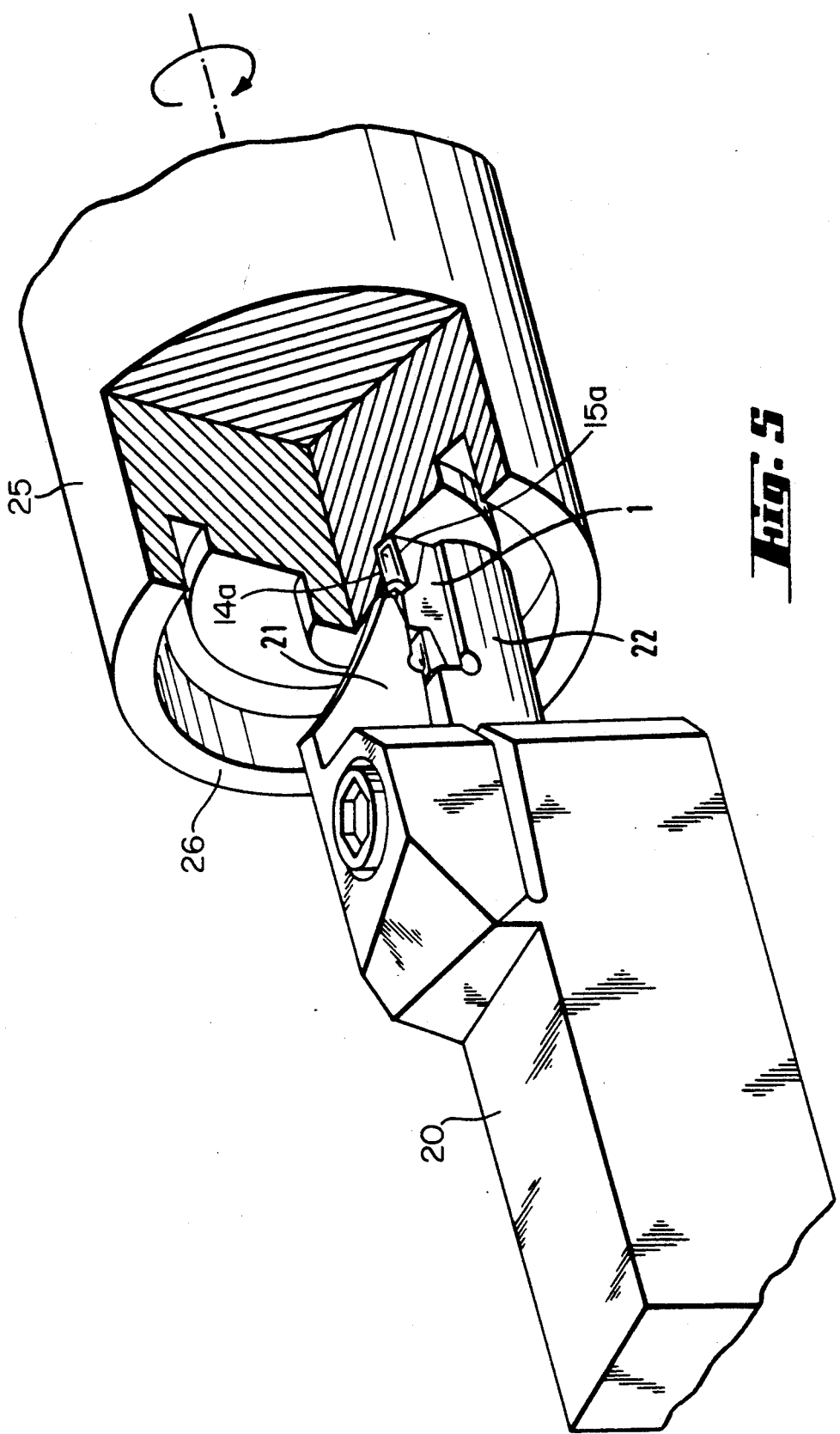

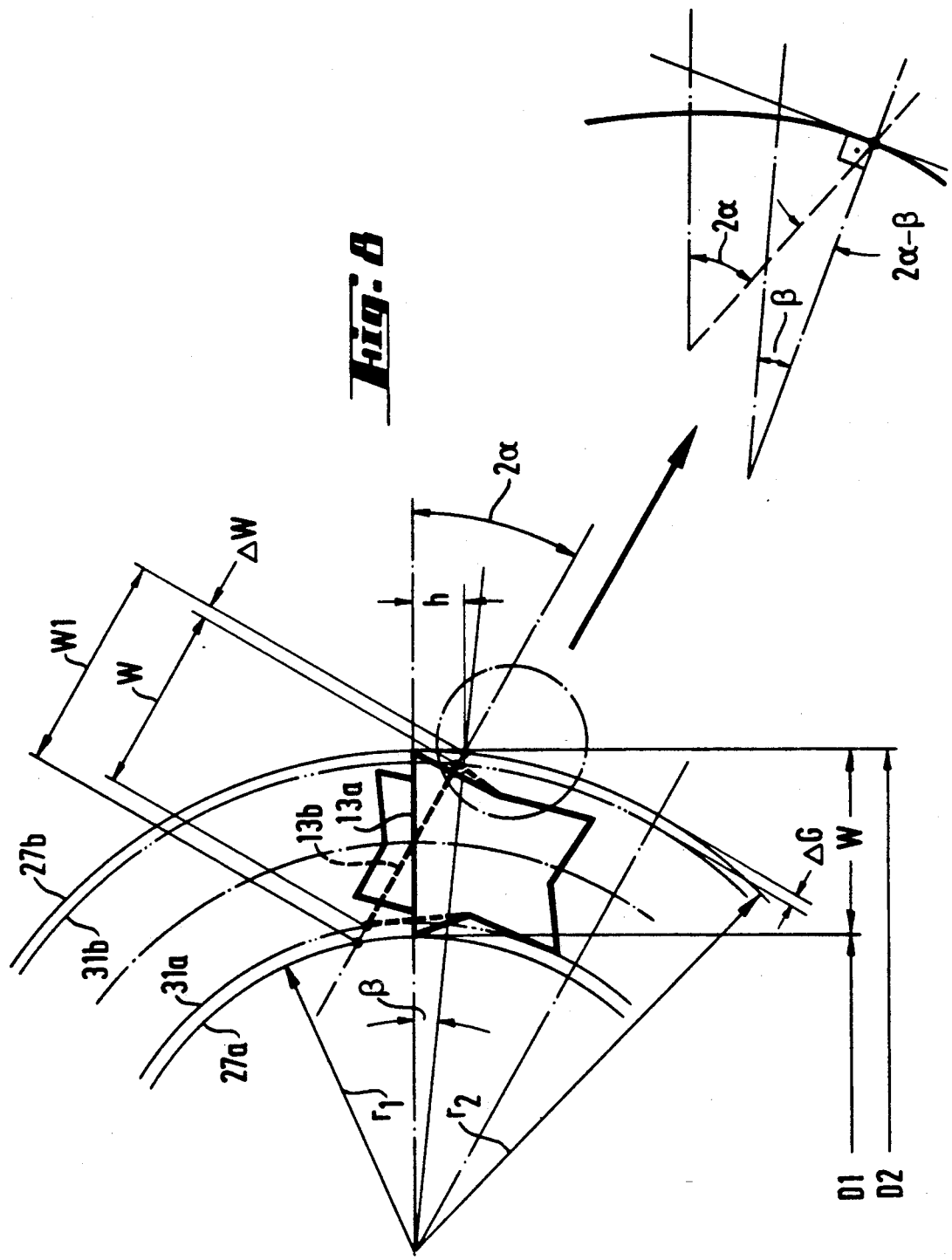

CUTTING INSERT

FIELD OF THE INVENTION

This invention relates to a cutting insert, particularly, but not exclusively, for use in face grooving.

BACKGROUND OF THE INVENTION

Such cutting inserts are usually of the replaceable kind and are releasably clamped between the clamping jaws of a tool holder. In order to allow for the face grooving operation which results in the formation of a circular face groove, it is known to use circularly curved clamping jaws so as to allow for their unhindered insertion during grooving into the circular groove. In addition, it is known to curve the flank surfaces of the insert in order to facilitate the unhindered insertion of the insert into the circular groove. The production of inserts with such curved flank surfaces, however, gives rise to considerable problems when using conventional moulding techniques and it has recently been proposed, as an alternative to curving the flank surfaces, to have planar flank surfaces which taper by amounts and directions such as to provide clearance between the flank surfaces and the side walls of the groove being cut.

A problem which arises with replaceable grooving cutting inserts in general, and face grooving cutting inserts in particular, is associated with the provision of the insert with a pair of opposite cutting edges. Thus, the provision of such cutting inserts with opposite cutting edges is clearly advantageous, seeing that it leads to a saving in cutting insert material and allows for the rapid indexing of the insert so that a fresh cutting edge is available for use when the opposite cutting edge has become dulled by use. The provision of cutting inserts with a pair of opposite cutting edges, however, will tend to limit the depth of the grooving cut, seeing that with grooving being effected by one cutting edge, any attempt to extend the depth of the cut so that the second, opposite cutting edge begins to penetrate this cut, results in this second, opposite edge becoming jammed within the circular groove.

There has been disclosed in the published European Patent Application No. 0 150 901, a double edged grooving insert designed for unlimited cutting depth, wherein a first cutting edge is located in a plane substantially at right angles to the second cutting edge. The production of such a grooving insert, especially when the cutting edges are to be provided with appropriate chip forming structures, gives rise to problems and requires the modification of normal moulding techniques.

BRIEF SUMMARY OF THE INVENTION

It is an object of the present invention to provide a new and improved cutting insert in which the above-referred-to desiderata are substantially attained and the above-referred-to disadvantages are substantially reduced or overcome.

According to the present invention, there is provided a cutting insert comprising a central body portion having a longitudinal plane of symmetry;

a pair of oppositely directed, end portions formed integrally with said body portion and being respectively formed with rake and flank surfaces and with first and second cutting edges of substantially equal width, the flank surfaces of each end portion tapering by amounts and in directions such as to provide clearance between the flank surfaces and the side walls of the groove being cut;

characterized in that a normal to the midpoint of said first cutting edge is inclined, in a first sense, with respect to said plane of symmetry, by an angle $\alpha$ and a normal to the midpoint of said second cutting edge is inclined in a second and opposite sense with respect to said plane of symmetry by an angle $\alpha$, whereby said edges are inclined with respect to each other by an angle $2\alpha$.

Such an insert, in accordance with the invention, is capable of ready production using known moulding techniques, thereby substantially obviating the necessity for grinding of the insert after its sintering.

Preferably, the insert is provided at each end portion thereof with a pair of side cutting edges located substantially normally with respect to the respective end cutting edges. With such inserts, cutting can be effected in directions transverse to the longitudinal axis of the insert. In the case of face grooving, the relative transverse displacement of the insert with respect to the workpiece, end face turning of up to the entire end face of the workpiece can be effected. In order to ensure that even the innermost central portion of the end face can be effectively turned, the tool holder designed to hold the insert in accordance with the invention is so arranged that the front cutting edge of the insert is located substantially along a line which extends normally with respect to the rotary axis of the workpiece.

BRIEF SUMMARY OF THE DRAWINGS

For a better understanding of the present invention and to show how the same may be carried out in practice, reference will now be made to the accompanying drawings, in which:

FIG. 3a is a perspective view of the insert with the central raised portion thereof removed in the interests of clarity;

FIG. 3b is an end elevation of the insert shown in FIG. 3a;

FIG. 5 is a perspective view of a cylindrical workpiece undergoing end face turning;

FIG. 8 is a diagrammatic view corresponding to that of FIG. 7 for the purposes of calculating minimum spacings of an insert in a groove.

DETAILED DESCRIPTION OF A PREFERRED EMBODIMENT

Figure 1:
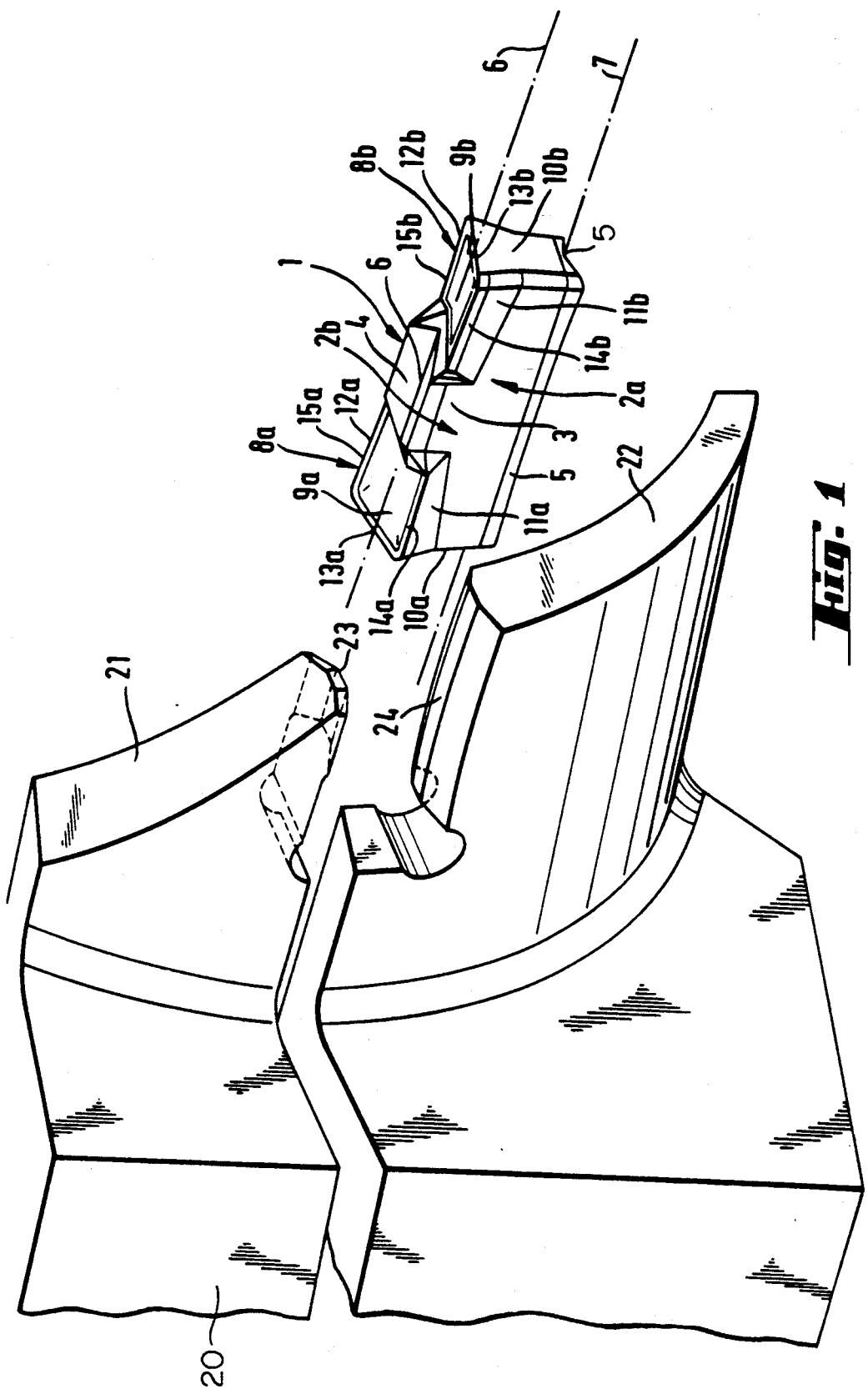
FIG. 1 is a perspective view of an end face grooving insert in accordance with the invention, juxtaposed with respect to the clamping jaws of a tool holder.

As seen in the drawings, a cutting insert 1 is constituted by an elongated element 2 whose lowermost portion 2a is of a rectangular cross-sectional shape and whose uppermost portion 2b includes a central body portion 3 whose sidewalls are coplanar with the sidewalls of the lower portion 2a. The central body portion 3 is formed with an upper, longitudinally grooved surface 4, whilst the lower portion 2a is formed with a lowermost longitudinally grooved surface 5, the grooves of the upper and lower surfaces 4, 5 being oppositely directed and being formed about central longitudinal axial lines 6, 7 which are parallel to each other. The longitudinal axial lines 6, 7 lie in a plane of symmetry 16 seen in FIGS. 3 and 5 of the drawings.

Integrally formed with the central body portion 3 are a pair of oppositely directed end portions 8a, 8b respectively provided with upper rake surfaces 9a, 9b, front planar surfaces 10a, 10b and respective side flank surfaces 11a, 12a and 11b, 12b. The rake surface 9a is bounded by a front cutting edge 13a and side cutting edges 14a, 15a whilst the rake surface 9b is formed with a front cutting edge 13b and side cutting edges 14b, 15b. The flank surfaces 11a, 12a and 11b, 12b taper from the side cutting edges 14a, 15a and 14b, 15b towards the lower portion 2a so as to provide clearance between these flank surfaces and the side walls of the groove being cut, as will be seen with reference to FIG. 5 of the drawings.

Figure 3:
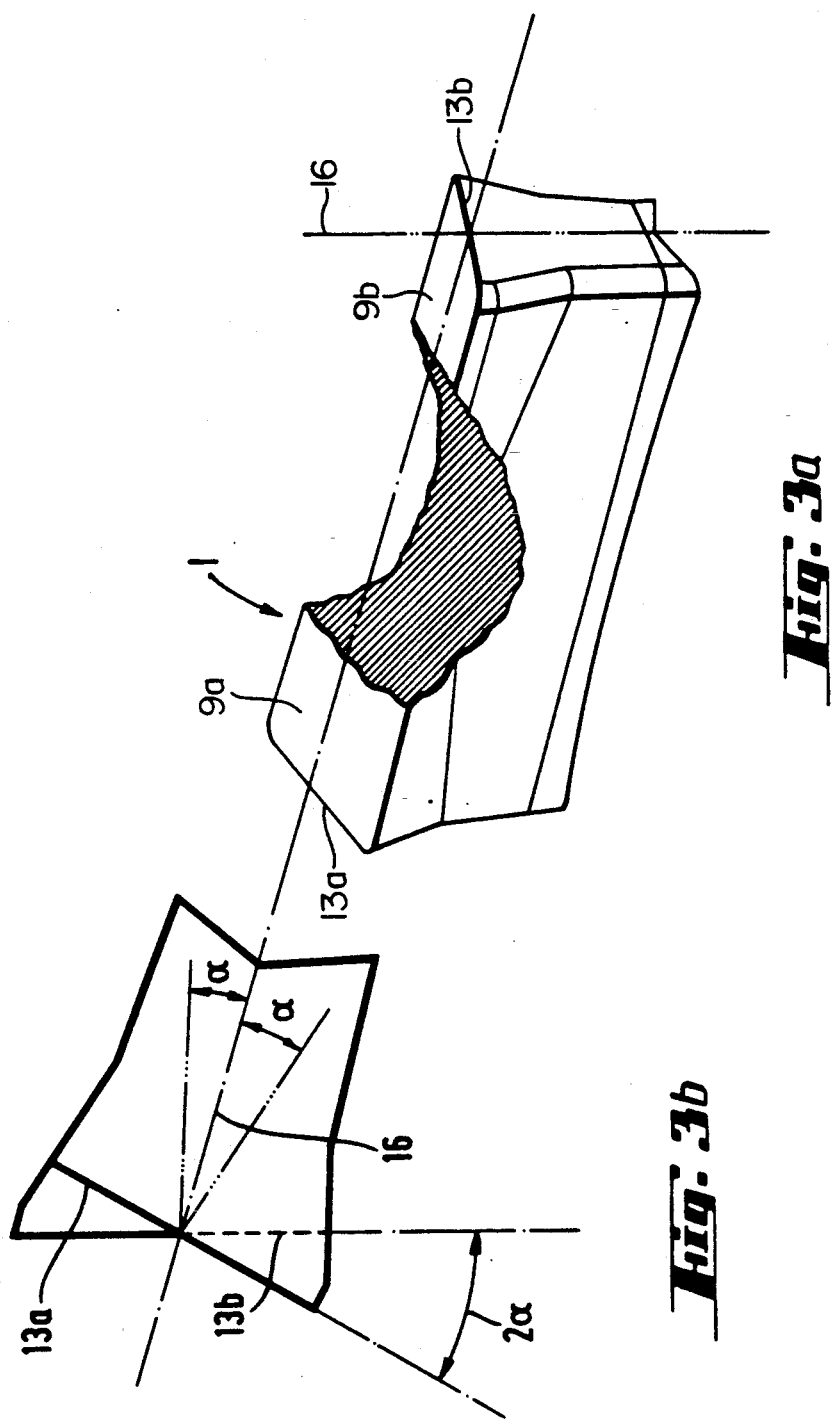

As can be seen from the drawings and particularly from FIG. 3, the rake surfaces 9a, 9b together with the cutting edges thereof, are respectively inclined in opposite senses with respect to the plane of symmetry 16. Thus, a normal to the midpoint of the cutting edge 13a is inclined with respect to the plane of symmetry 16 by an angle of $\alpha$ whilst a normal to the midpoint of the cutting edge 13b is inclined with respect to the plane of symmetry 16 by an angle of $\alpha$. The cutting edges 13a and 13b are therefore inclined with respect to each other by an angle of 2$\alpha$.

Figure 2:
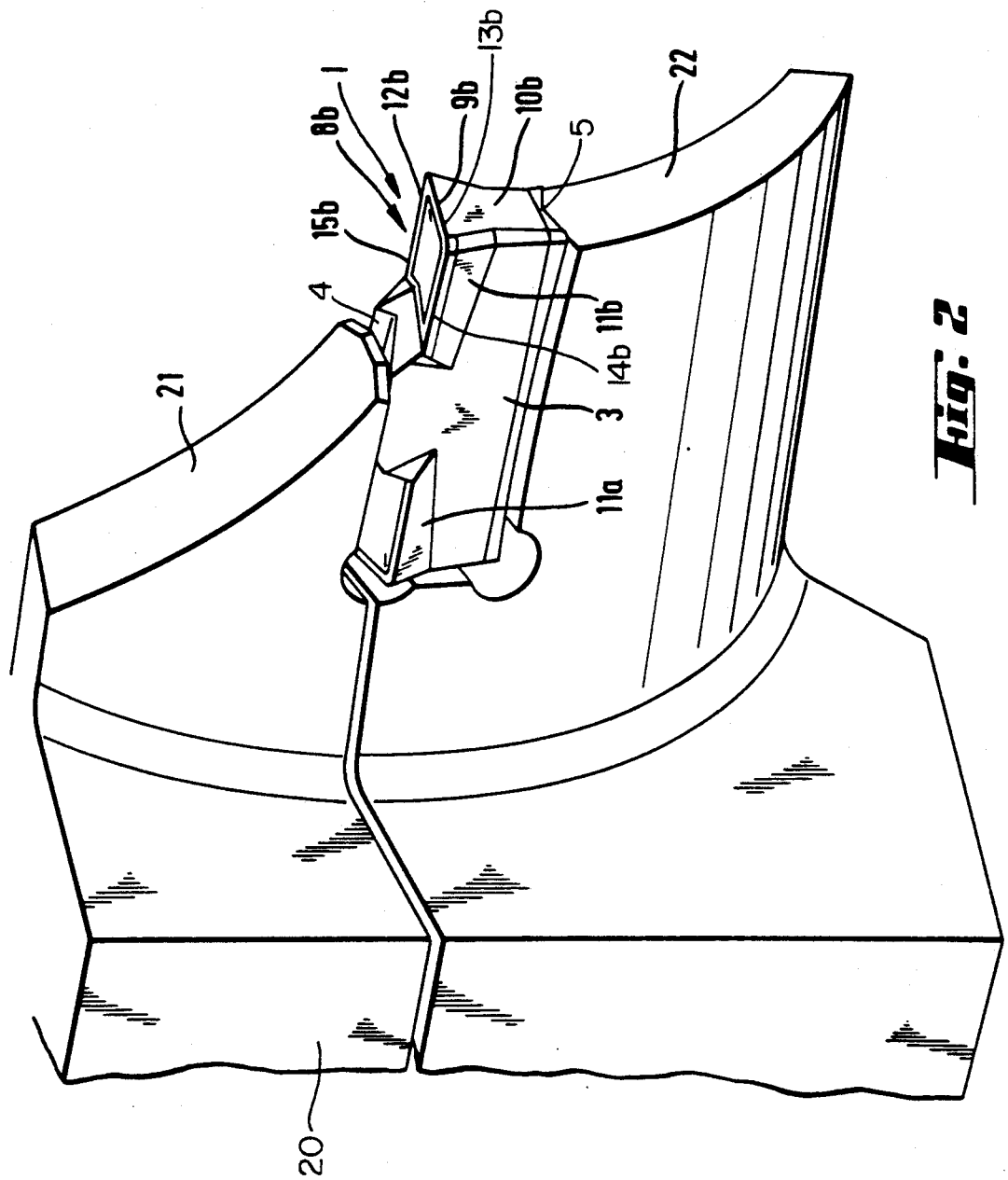
FIG. 2 is a perspective view of the insert when clamped in the tool holder.
Figure 4:
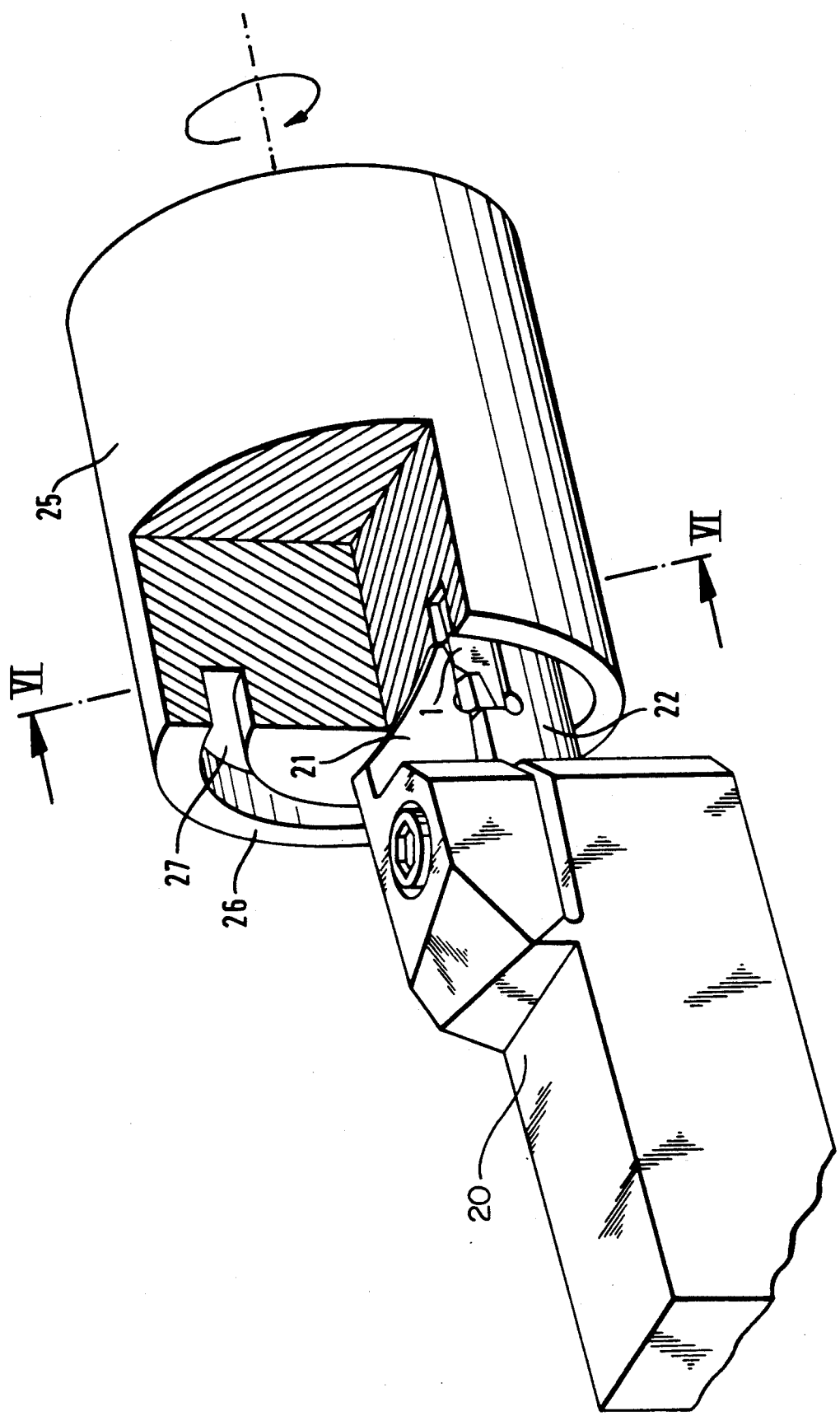
FIG. 4 is a perspective view of a cylindrical workpiece undergoing face grooving.

As seen in FIGS. 1 and 2 of the drawings, the insert 1 is designed to be clampingly held between a pair of jaws 21, 22 of a tool holder 20 shown in FIG. 4 of the drawings. The lower surface of the jaw 21 is formed as a convex rib 23 designed to fit into the concave groove 4 of the insert 1, whilst the upper surface of the jaw 22 is formed as a convex rib 24 designed to fit into the concave groove 5 of the insert 1. The jaws 21, 22 are curved so that when viewed in the plane of the paper appear to be convex. In use, and as shown in FIG. 2 of the drawings, the insert 1 is inserted between the jaws 21, 22 so that the ribs 23 and 24 mate respectively in the grooves 4 and 5 and the jaws are then clamped together by means (not shown).

The use of the insert 1 when mounted in the tool holder as shown in FIG. 2 of the drawings, in the end face grooving and turning of a workpiece, will now be described respectively with reference to FIGS. 4 and 5 of the drawings. As seen in FIG. 4, a cylindrical workpiece 25, shown with an end quadrant removed in the interests of clarity, having an end face 26 is rotated in a clockwise sense about its longitudinal axis and with reference to the juxtaposed cutting insert 1 so as to form a circular groove 27.

As shown in FIG. 5 of the drawings, as the workpiece is rotated, the insert in the cutting tool is moved radially towards the centre of the workpiece thereby resulting in the end face turning of the workpiece.

Where end face grooving is to be effected, as shown in FIG. 4, differing inserts have to be employed for successive ranges of diameters. Where, however, end face turning is effected, a single insert can be employed over the entire face seeing that as the insert moves towards the centre of the workpiece it is no longer juxtaposed to the outer groove wall.

Figure 7:
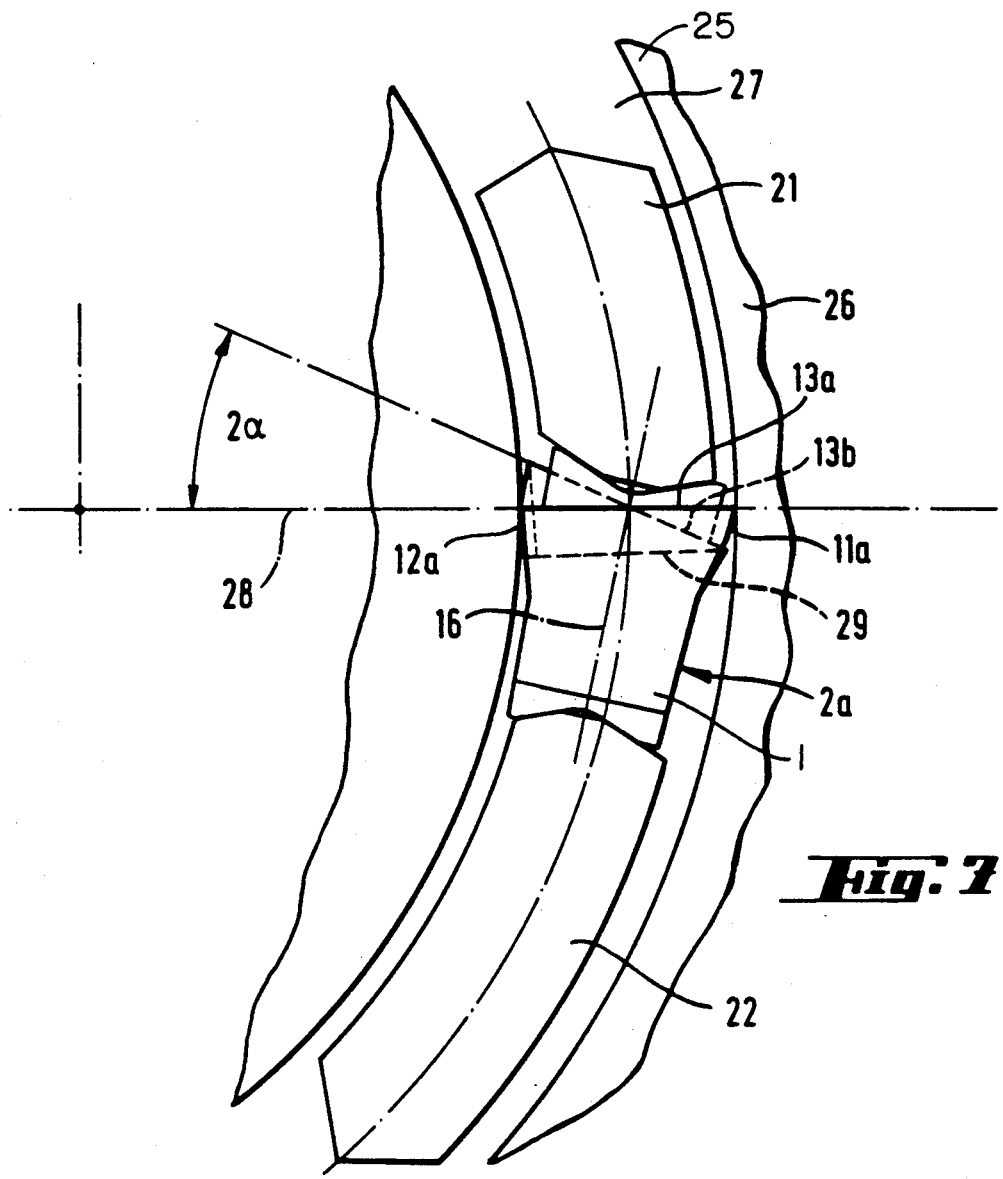
FIG. 7 is a view on an enlarged scale of a detail shown in FIG. 4.
Figure 6:
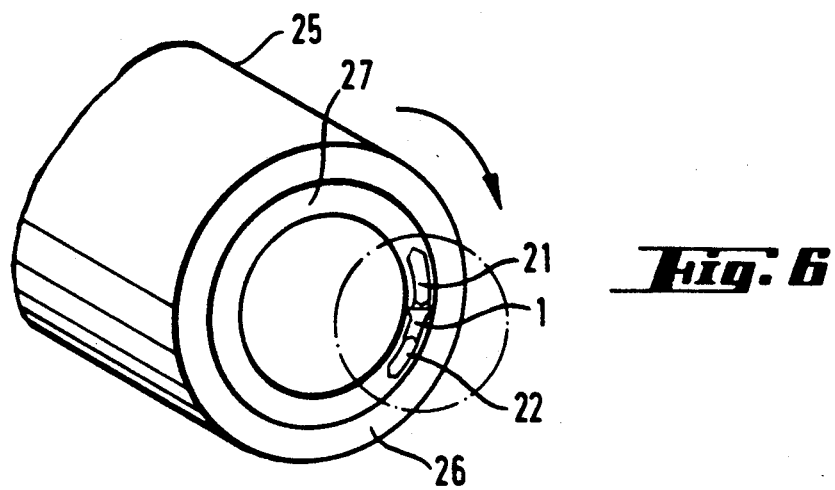
FIG. 6 is a cross-sectional view of the workpiece and cutting tool shown in FIG. 4, taken along the line VI—VI.

Reference will now be made to FIGS. 6 and 7 of the drawings for a detailed description of the location of the insert 1 with respect to the workpiece 25 and the way in which the insert is employed so as to achieve an unlimited depth of grooving. As can be clearly seen from FIG. 4 of the drawings, the curvature of the jaws 21, 22 enable the ready entry of the tool with the gripped insert into the groove 27. As can be seen from FIG. 7 of the drawings, the insert is mounted within the gripping jaws 21, 22 so that its front cutting edge 13a is located along a radius 28 of the rotational circle of the workpiece 25. In this position, the rear cutting edge 13b, which is angularly disposed with respect to the front cutting edge 13a, has a width when projected onto a line 29 parallel to the cutting edge 13a, which is considerably less than the width of the cutting edge 13a. If now the workpiece is rotated in a clockwise sense and the cutting edge is displaced inwardly and in the axial direction of the workpiece, the circular groove 27 is formed whose width corresponds to the width of the cutting edge 13a. By virtue of the provision of the tapering planar flank surfaces 11a, 12a, these flank surfaces are always clear of the sidewalls of the groove 27 and, as explained above, the rear cutting edge 13b has a width, when considered with respect to the width of the groove 27, which is considerably less than the width of the groove 27. Thus, the depth of the end face grooving is unlimited by the length of the insert.

In view of the fact that the insert is provided with side cutting edges 14a, 15a, transverse movement of the insert as shown in FIG. 5 of the drawings is effective in extending the width of the groove, and when this transverse movement is in the direction of the centre of the workpiece, the fact that the cutting edge 13a has been initially disposed along the radius of the workpiece ensures that it is possible to turn the entire end face of the workpiece without leaving any residual central core.

Reference will now be made to FIG. 8 of the drawings, which essentially corresponds to FIG. 7 thereof, for an understanding as to how the particular construction of the insert and especially the geometry thereof is effective in ensuring not only the unhindered total insertion of the insert into the groove but also that the spacing between the walls of the groove and the rear cutting edge is always sufficient as to avoid the dangers of foreign bodies becoming jammed between the walls of the groove and the rear cutting edge.

As seen in FIG. 8

W = width of the front and rear cutting edges 13a and 13b;

$W_1$ = distance of intersection points of groove walls 27a and 27b with a line passing through the cutting edge 13b;

$\beta$ = angle subtended between the radius $r_1$ of the workpiece and passing through cutting edge 13a and the radius $r_2$ which passes through the point of intersection of the line extending through the cutting edge 13b;

2$\alpha$ = angle subtended between the cutting edges 13a and 13b;

$$\Delta W = W_1 - W_2/2$$

$\Delta G$ = effective spacing between groove walls 27a, 27b on the one hand and the circular paths 31a, 31b respectively traced by the opposite ends of the cutting edge 13b on the other hand.

Thus ΔG corresponds to the maximum dimension of a foreign body if it is not to become jammed between the trailing cutting edge 13b and the groove walls. Reference to FIG. 8, and in particular the enlarged detail thereof, shows clearly that, to a reasonable approximation, $$\Delta G = \Delta W \cdot \cos(2\alpha - \beta)$$

Whilst the invention has been specifically described with reference to the use of the insert in end face grooving, it will be readily appreciated that the same insert can be used in longitudinal turning operations.

The provision of an insert with the geometry described above renders it possible to provide the insert with a pair of oppositely directed rake surfaces and cutting edges without any limitation on the degree of depth of grooving and this clearly renders the production of these inserts much more economical.

I claim:

1. A cutting insert comprising an elongated body portion of substantially rectangular cross-sectional shape having a longitudinal plane of symmetry and having a base surface extending along the entire length of the insert and having an upper surface extending along a central portion of the insert and front, rear and side planar surfaces; said insert being further provided with first and second oppositely directed end portions formed integrally with the body portion and respectively extending between either end of the upper surface and the adjacent front and rear surfaces; said first end portion having a first rake surface inclined in a first sense with respect to said plane of symmetry; a first front relief flank constituted by said first planar surface; a first pair of side relief flanks angularly disposed with respect to said side planar surfaces; a first front cutting edge defined between said first rake surface and said front relief flank and a first pair of side cutting edges respectively defined between said first rake surface and said side relief flanks; said second end portion having a second rake surface inclined in an opposite sense with respect to said plane of symmetry; a second front relief flank constituted by said rear planar surface; a second pair of side relief flanks angularly disposed with respect to said side planar surfaces; a second front cutting edge defined between second rake surface and said second front relief flank and a pair of side cutting edges respectively defined between said second rake surface and said second side relief flanks; the first and second pairs of side flank surfaces tapering by amounts and in directions so as to provide clearance between the side relief flank surfaces and the side walls of a groove being cut; said upper and lower surfaces being formed with engaging means symmetrical about said plane of symmetry; a normal to the mid-point of the first front cutting edge being inclined in a first sense with respect to the plane of symmetry by an angle $\alpha$ and a normal to the mid-point of the second front cutting edge being inclined in a second and opposite sense with respect to the plane of symmetry by an angle $\alpha$ whereby the first and second front cutting edges are inclined with respect to each other by an angle $2\alpha$.

2. A cutting tool comprising a cutting insert comprising an elongated body portion of substantially rectangular cross-sectional shape having a longitudinal plane of symmetry and having a base surface extending along the entire length of the insert and an upper surface extending along a central portion of the insert and front, rear and side planar surfaces; said insert being further provided with first and second oppositely directed end portions formed integrally with the body portion and respectively extending between either end of the upper surface and the adjacent front and rear surfaces; said first end portion having a first rake surface inclined in a first sense with respect to said plane of symmetry; a first front relief flank constituted by said first planar surface; a first pair of side relief flanks angularly disposed with respect to said side planar surfaces; a first front cutting edge defined between said first rake surface and said front relief flank and a first pair of side cutting edges respectively defined between said first rake surface and said side relief flanks; said second end portion having a second rake surface inclined in an opposite sense with respect to said plane of symmetry; a second relief flank constituted by said rear planar surface; a second pair of side relief flanks angularly disposed with respect to said planar surfaces; a second front cutting edge defined between said second rake surface and said second front relief flank and a second pair of side cutting edges respectively defined between said second rake surface and said second side relief flank; the first and second pairs of side flank surfaces tapering by amounts and in directions so as to provide clearance between the side relief flank surfaces and the side walls of the groove being cut; said upper and lower surfaces being formed with engaging means symmetrical about said plane of symmetry; a normal to the mid-point of the first front cutting edge being inclined in a first sense with respect to the plane of symmetry by an angle $\alpha$ and a normal to the mid-point of the second front cutting edge being inclined in a second and opposite sense with respect to the plane of symmetry by an angle $\alpha$ whereby the first and second front cutting edges are inclined with respect to each by an angle $2\alpha$; and a tool holder having a pair of clamping jaws defining between them an insert retaining slot; opposite surfaces of said jaws being formed with engaging means designed to mate with an engaging means formed in the upper and lower surfaces of the insert; said jaws being curved so as to allow their accommodation in a circular groove, said insert being held in said retaining slot with a leading front cutting edge located normally with respect to a longitudinal axis of the tool holder.

* * * * *